(12) United States Patent
Hirose et al.

(10) Patent No.: US 6,767,193 B2
(45) Date of Patent: Jul. 27, 2004

(54) PISTON TYPE COMPRESSOR

(75) Inventors: Ryuichi Hirose, Tochigi (JP); Hiroyasu Nadamoto, Tochigi (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 10/134,621

(22) Filed: Apr. 30, 2002

(65) Prior Publication Data

US 2002/0176786 A1 Nov. 28, 2002

(30) Foreign Application Priority Data

May 1, 2001 (JP) ........................................ 2001-134482

(51) Int. Cl.$^7$ ............................. F04B 1/12; F04B 27/08
(52) U.S. Cl. .................. 417/269; 417/571; 137/512.15; 137/512.1
(58) Field of Search ...................... 137/512.1, 512.15, 137/855, 856; 417/269, 569, 557, 571, 572

(56) References Cited

U.S. PATENT DOCUMENTS 3,751,005 A * 8/1973 Earley ........................ 251/368
4,781,540 A * 11/1988 Ikeda et al. .................. 417/269
5,722,818 A * 3/1998 Ohta et al. ................... 417/312
6,113,369 A * 9/2000 Selway ........................ 417/569
6,336,795 B1 * 1/2002 Yamada ....................... 417/569

FOREIGN PATENT DOCUMENTS

GB          2 343 934 A   *   5/2000
JP          9-280168          10/1997

* cited by examiner

Primary Examiner—Justine R. Yu
Assistant Examiner—Han L Liu
(74) Attorney, Agent, or Firm—Foley & Lardner LLP

(57) ABSTRACT

Between a cylinder block and a housing, there is disposed a valve base plate. The valve base plate is formed with mutually isolated first and second intake openings for fluidly communicating each of piston chambers in the cylinder block with an intake chamber defined in the housing. A reed valve element is incorporated with each piston chamber. The reed valve element is arranged to open the first and second intake openings with the aid of a fluid when the piston is moved away from the reed valve element and close the first and second intake openings with the aid of the fluid when the piston is moved toward the reed valve element. Due to provision of the two, viz., first and second intake openings, opening movement of the reed valve element is carried out along with a twisting motion of the same.

15 Claims, 12 Drawing Sheets

PISTON TYPE COMPRESSOR

BACKGROUND OF THE INVENTION

1. Field of the Invention

The present invention relates in general to compressors and more particularly the compressors of a piston type that is widely used in a cooling system of automotive air conditioners.

2. Description of the Related Art

In order to clarify the task of the present invention, a piston type compressor disclosed in Laid-open Japanese Patent Application (Tokkai-hei) 9-280168 will be briefly described. In fact, the compressor of this publication is of a so-called wobble plate piston type that has a wobble plate for inducing reciprocating movement of pistons.

The compressor of the publication generally comprises a cylinder block in which a plurality of cylindrical piston bores are circularly arranged. The cylindrical piston bores accommodate respective pistons actuated by a wobble plate. A housing is attached to one end face of the cylinder block having a valve base plate disposed therebetween. The housing has an intake chamber defined therein. The valve base plate is formed with a plurality of intake openings through which the cylindrical piston bores are communicated with the intake chamber respectively. The intake openings are provided at the cylinder block side with respective reed valve elements for opening and closing the intake openings. That is, each intake opening and a corresponding reed valve element constitute a refrigerant intake valve. The reed valve elements are of a type having an enlarged leading end portion which actually opens and closes the corresponding intake opening. Stopper plates are provided at the end face of the cylinder block to regulate a lifting of the reed valve elements. Due to provision of the stopper plates, excessive opening movement of each reed valve element is suppressed and thus generation of undesired noise is prevented or at least minimized. For increasing a refrigerant intake efficiency of the intake valves, each reed valve element is constructed to have asymmetrical sides. Thus, under operation of the compressor, opening movement of the reed valve element is carried out along with a twisting motion of the same. With this, pressure loss caused by the operation of the intake valves is reduced and thus the refrigerant intake efficiency is increased.

SUMMARY OF THE INVENTION

However, due to inherent construction, the reed valve elements of the above-mentioned type tend to lower the responsiveness thereof. That is, in such reed valve element, starting of opening movement tends to be delayed as compared with a normal reed valve element that has symmetrical sides. If such delay is not small, satisfied increase in refrigerant intake efficiency of the intake valves is not expected.

Accordingly, an object of the present invention is to provide a piston type compressor that is free of the above-mentioned shortcoming.

That is, according to the present invention, there is provided a piston type compressor in which an opening movement of a reed valve element is carried out along with an assured twisting motion of the same without sacrificing the responsiveness.

According to a first aspect of the present invention, there is provided a piston type compressor for compressing a fluid, which comprises a cylinder block having at least one piston bore formed therein; a piston slidably received in the piston bore; a drive unit for sucking the fluid into the piston bore and compressing the fluid in the piston bore by using said piston; a housing having an intake chamber for taking the fluid thereinto, the housing being attached to one end of the cylinder block so that one end of the piston bore faces the intake chamber; a valve base plate disposed between the end of the cylinder block and the housing, the valve base plate having mutually isolated first and second intake openings through which the intake chamber and the piston bore are fluidly communicated; and an intake valve plate disposed between the end of the cylinder block and the valve base plate and having a reed valve element defined thereby, the reed valve element being arranged to open the first and second intake openings thereby to introduce the fluid into the piston bore from the intake chamber therethrough when the piston is moved away from the reed valve element and close the first and second intake openings thereby to stop the fluid introduction into the piston bore from the intake chamber when the piston is moved toward the reed valve element.

According to a second aspect of the present invention, there is provided a wobble plate piston type compressor for compressing a fluid, which comprises a cylinder block having at least one cylindrical piston bore formed therein; a piston slidably received in the piston bore; a wobble plate arranged to effect a wobble motion; a piston rod having end universally pivotally connected to the piston and the other end universally pivotally connected to the wobble plate; a housing having an intake chamber for taking the fluid thereinto, the housing being attached to one end of the cylinder block so that one end of the piston bore faces the intake chamber; a valve base plate disposed between the end of the cylinder block and the housing, the valve base plate having mutually isolated first and second intake openings through which the intake chamber and the piston bore are fluidly communicated; and an intake valve plate disposed between the end of the cylinder block and the valve base plate and having at least one reed valve element defined thereby, the reed valve being arranged to open the first and second intake openings thereby to introduce the fluid into the piston bore from the intake chamber therethrough when the piston is moved away from the reed valve element and close the first and second intake openings thereby to stop the fluid introduction into the piston bore from the intake chamber when the piston is moved toward the reed valve element, the reed valve element including an elastic arm portion which extends from an inner base portion of the intake valve plate along an imaginary center line, a first valve element part integral with the elastic arm portion and shaped and sized to open and close the first intake opening, the first valve element part being placed on the imaginary center line, and a second valve element part integral with the elastic arm portion and shaped and sized to open and close the second intake opening, the second valve element part being offset relative to the imaginary center line.

BRIEF DESCRIPTION OF THE DRAWINGS

Other objects and advantages of the present invention will become apparent from the following description when taken in conjunction with the accompanying drawings, in which:

FIGS. 6A and 6B are drawings showing operative movement of the reed valve element, in which FIG. 6A is a view taken from the direction of arrow "A" of FIG. 5 and FIG. 6B is a view taken from the direction of arrow "B" of FIG. 5;

DETAILED DESCRIPTION OF THE EMBODIMENTS

In the following, embodiments of the present invention will be described in detail with reference to the accompanying drawings.

For ease of understanding, various directional terms, such as, right, left, upper, lower, rightward, etc., are used in the description. However, such terms are to be understood with respect to a drawing or drawings on which corresponding part or portion is illustrated.

Figure 1:
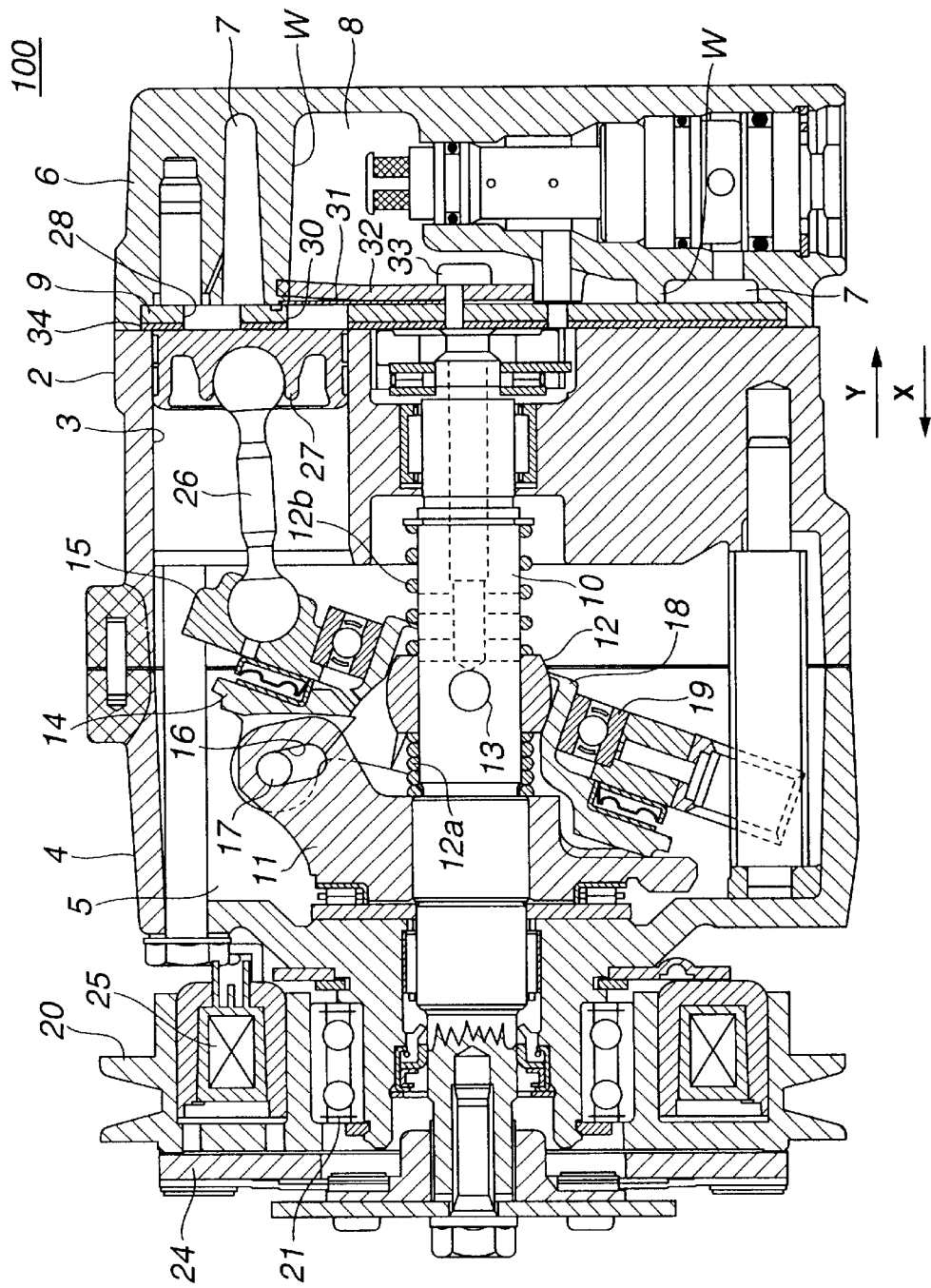
FIG. 1 is a section view of a wobble plate piston type compressor which is a first embodiment of the present invention.

Referring to FIGS. 1 to 7, particularly FIG. 1 of the drawings, there is shown a wobble plate piston type compressor 100 which is a first embodiment of the present invention. As shown, the compressor 100 is of a so-called single head type.

As is best shown in FIG. 1, the compressor 100 comprises a cylinder block 2 in which six cylindrical piston bores 3 are arranged circularly, a front housing 4 attached to a left end face of the cylinder block 2 to define therebetween a crank chamber 5 and a rear housing 6 attached to a right end face of the cylinder block 2 having a circular valve base plate 9 disposed therebetween.

The rear housing 6 has therein both an annular intake chamber 7 and a circular discharge chamber 8 which are parted by a generally circular wall W. As is understood from FIG. 3, the annular intake chamber 7 is arranged to surround the circular discharge chamber 8.

Referring back to FIG. 1, within the crank chamber 5, there extends a drive shaft 10. A drive plate 11 is fixed to the drive shaft 10 to rotate therewith. A sleeve 12 is axially slidably disposed about the drive shaft 10. A journal member 14 is pivotally connected to the sleeve 12 through aligned pins 13. A wobble plate 15 is disposed on a boss portion 18 of the journal member 14 through a ball bearing 19. The ball bearing 19 has an inner race tightly disposed on the boss portion 18 and an outer race tightly disposed in a recess formed in the wobble plate 15. The swing angle of the wobble plate 15 relative to the drive shaft 10 is controlled by a pin 17 of the journal member 14 that is slidably received in an elongate opening 16 formed in the drive plate 11. First and second coil springs 12a and 12b are disposed about the drive shaft 10 to bias the sleeve 12 toward a force balanced position.

The front housing 4 has a diametrically reduced left end portion on which a pulley 20 is disposed through a ball bearing 21. Although not shown in the drawing, a drive belt is put on the pulley 20 to drive the same. As shown, the reduced left end portion of the front housing 4 has a center bore through which a left end of the drive shaft 10 passes to be exposed to the outside.

A clutch plate 24 of metal is tightly connected to the exposed left end of the drive shaft 10 in a manner to face a left end surface of the pulley 20. An electromagnetic coil 25 is concentrically received in the pulley 20. Thus, when the coil 25 is energized, the clutch plate 24 is attracted by and attached to the pulley 20 causing a united rotation of the pulley 20 with the drive shaft 10.

The six cylindrical piston bores 3 of the cylinder block 2 respectively receive pistons 27. Each piston 27 is operatively connected to the wobble plate 15 through a piston rod 26. For this operation connection, the piston rod 26 has a spherical left end universally pivotally received in a spherical bore formed in the wobble plate 15 and a spherical right end universally pivotally received in a spherical bore formed in the piston 27.

Thus, when the drive shaft 10 is rotated about its axis, the rotation is converted to reciprocating movements of the six pistons 27 in the respective cylindrical piston bores 3 through the respective piston rods 26. Due to the reciprocating movement of each piston 27, the refrigerant is led into the cylindrical piston bore 3 from the intake chamber 7, compressed to change to a highly compressed and highly heated medium and discharged to the discharged chamber 8.

The valve base plate 9 intimately disposed between each of the cylindrical piston bores 3 and each of the intake and discharge chambers 7 and 8 is formed with six first intake openings 28, six second intake openings 29 (not shown in FIG. 1) and six discharge openings 30. The six first intake openings 28 and the six second intake openings 29 constitute six pairs of intake openings, which respectively communicate the six cylindrical piston bores 3 with the intake chamber 7, while the six discharge openings 30 respectively communicate the six cylindrical piston bores 3 with the discharge chamber 8. The positioning of these openings 28, 29 and 30 relative to the intake and discharge chambers 7 and 8 is easily understood from FIG. 3.

Referring back to FIG. 1, each of the discharge openings 30 is provided, on a right surface of the valve base plate 9 facing the discharge chamber 8, with a reed valve element 31. As shown, each reed valve element 31 is connected to the valve base plate 9 together with a stopper plate 32 by means of a fixing member 33. The stopper plate 32 is arranged to regulate a lifting of the reed valve element 31.

On a left surface of the valve base plate 9, there is put a circular intake valve plate 34 of which peripheral portion is tightly held between a peripheral portion of the valve base plate 9 and that of the cylinder block 2, as shown. The intake valve plate 34 is constructed of a thin metal plate.

Figure 2:
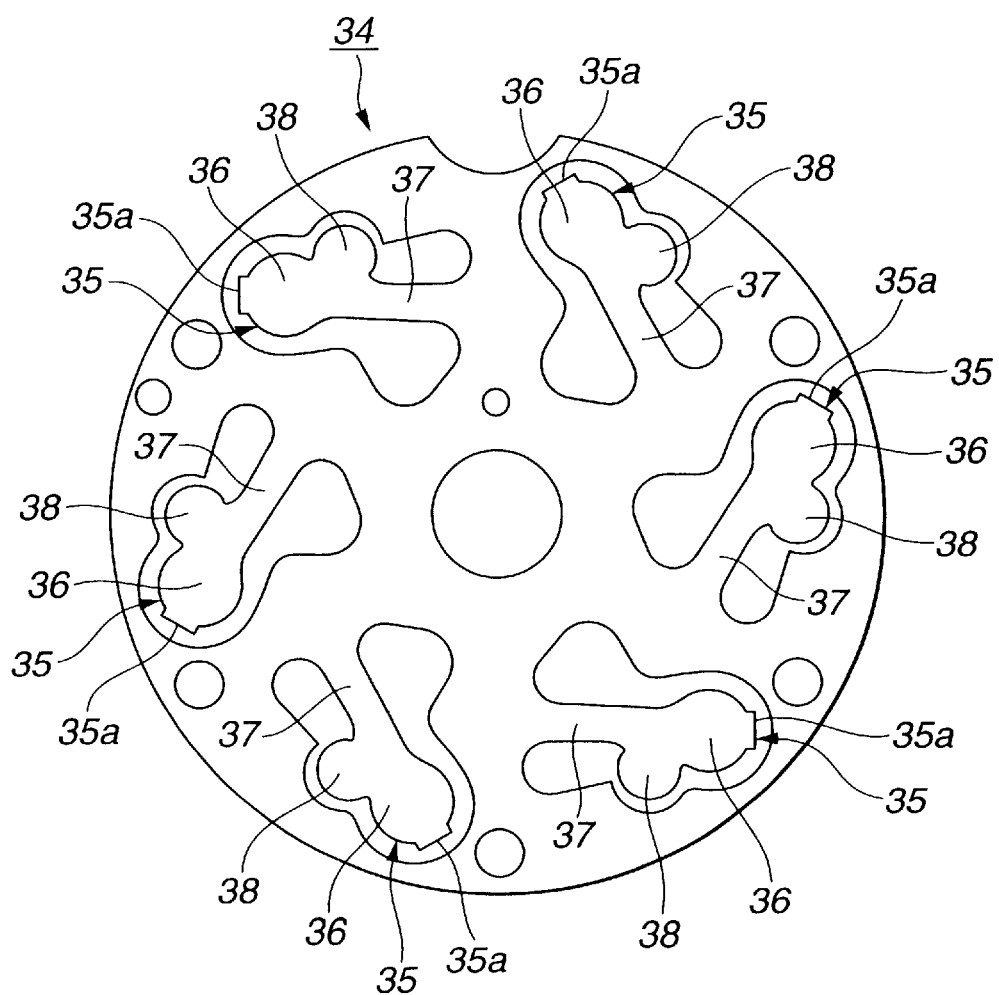
FIG. 2 is a view of an intake valve plate, which is taken from the direction of arrow "Y" of FIG. 1.
Figure 3:
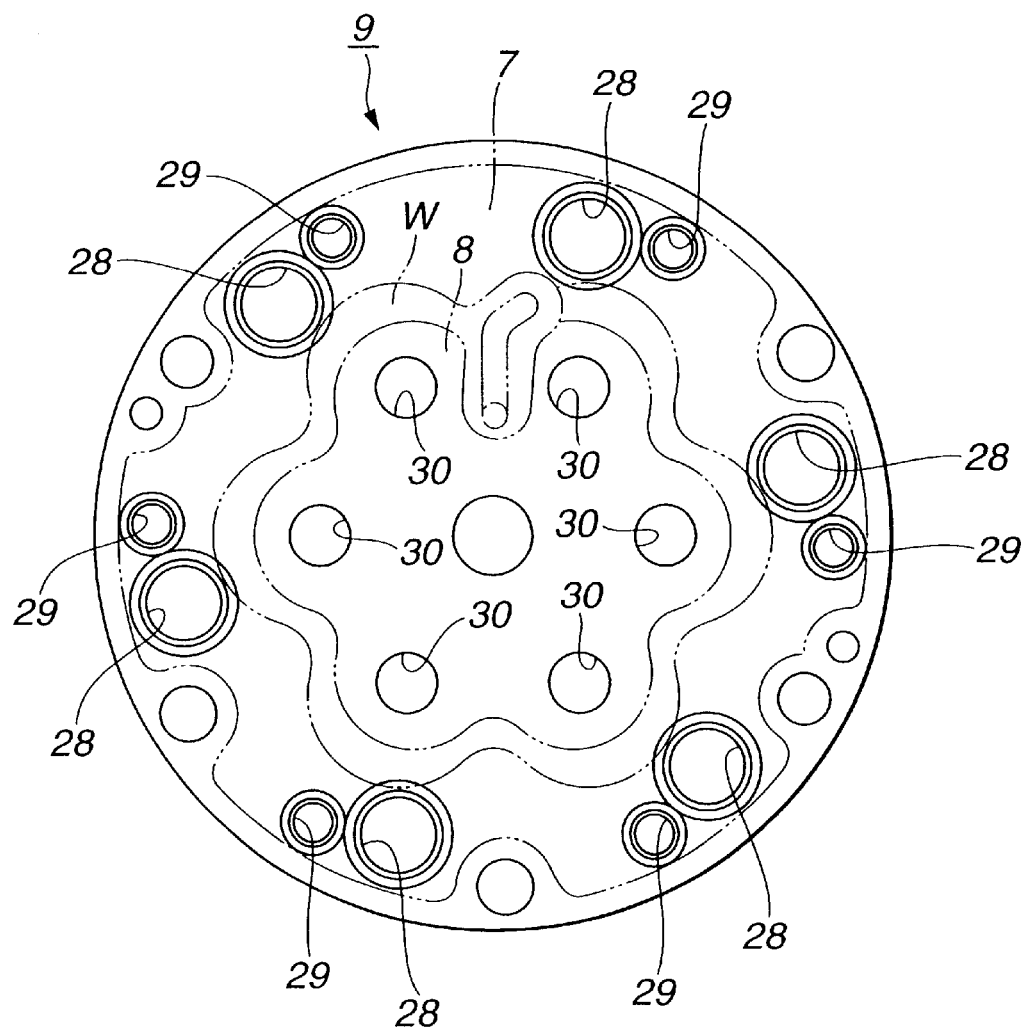
FIG. 3 is a view of a valve plate, which is taken from the direction of arrow "Y" of FIG. 1.
Figure 4:
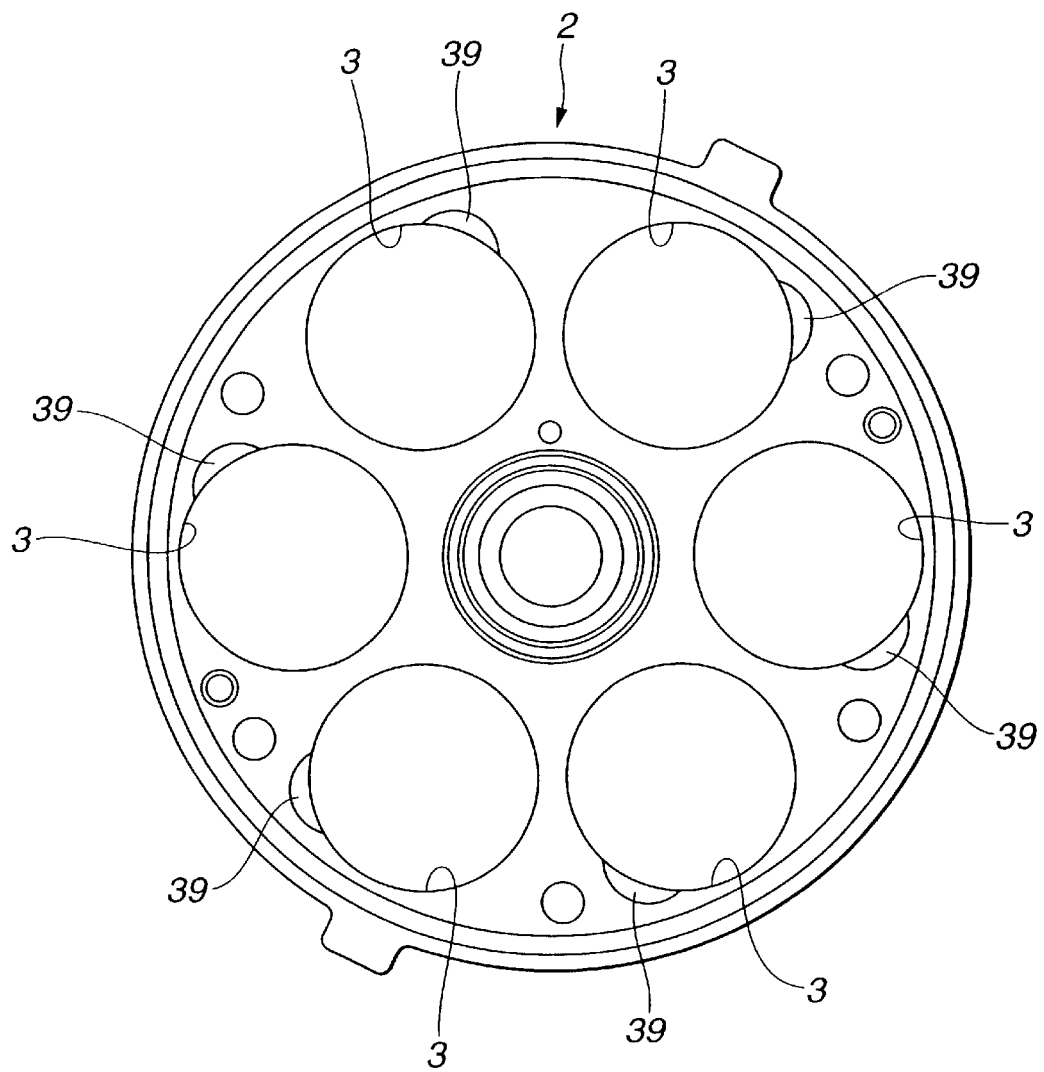
FIG. 4 is a view of an end face of a cylinder block, which is taken from the direction of arrow "X" of FIG. 1.

As is seen from FIG. 2, the intake valve plate 34 is formed with six reed valve elements 35 which are circularly arranged about a center opening thereof. These reed valve elements 35 are the same in shape except orientation and produced by pressing or punching a blank sheet of the intake valve plate 34. Upon assembly, these six reed valve elements 35 are respectively associated with the above-mentioned six pairs of intake openings (28, 29) formed in the valve base plate 9. Each reed valve element 35 is shaped to exhibit a suitable elasticity.

Figure 5:
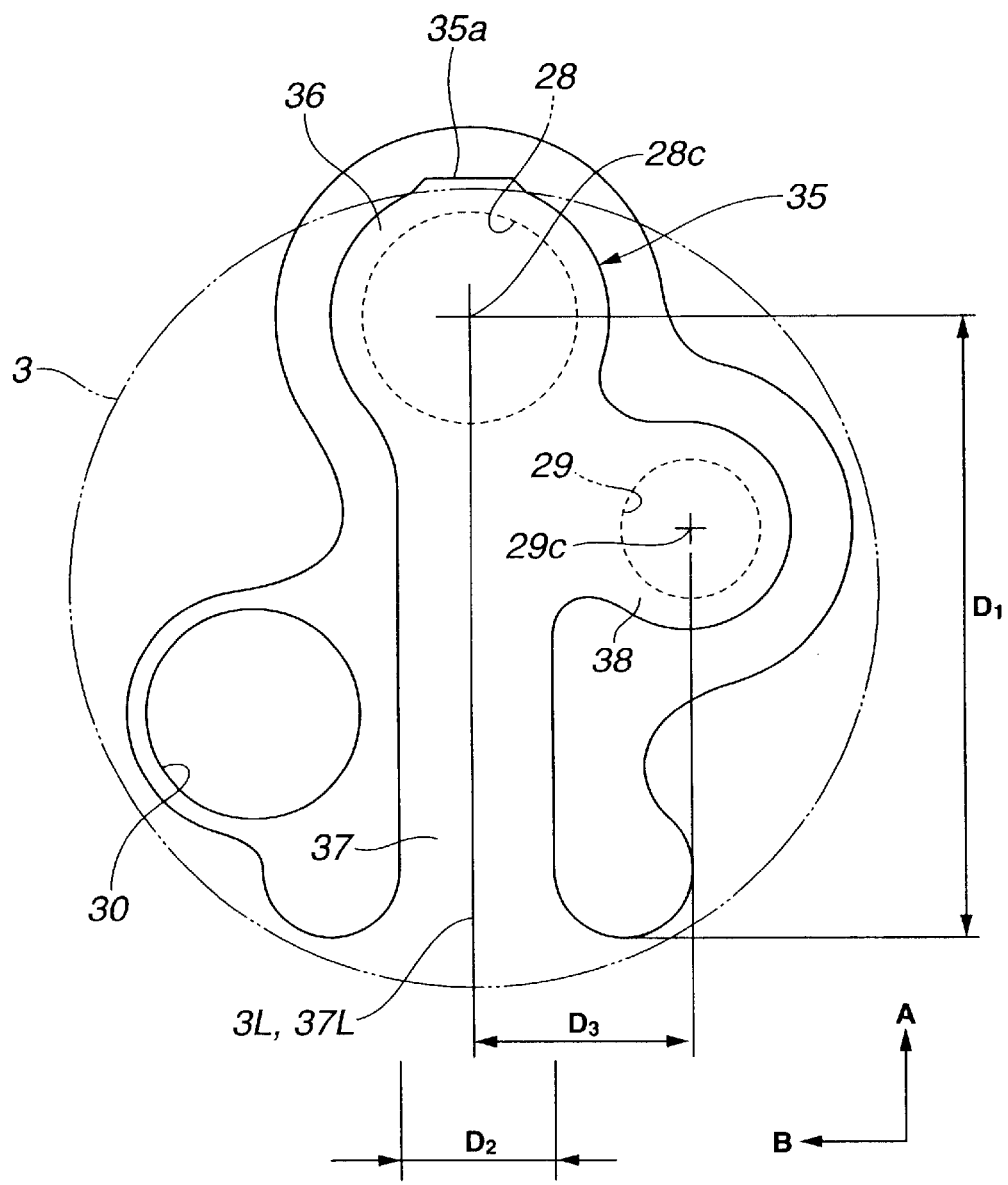
FIG. 5 is an enlarged view of an essential portion of the first embodiment, showing a cylindrical piston bore, a first intake opening, a second intake opening, a discharge opening and a reed valve element.

One of the reed valve elements 35 is shown in FIG. 5 on a large scale. As shown, the reed valve element 35 is arranged and shaped to extend across a diametrical part of the corresponding cylindrical piston bore 3.

The reed valve element 35 comprises an elastic arm portion 37 which extends outward from an inner base portion of the intake valve plate 34 (see FIGS. 2 and 5), a generally circular first valve element part 36 which is shaped and sized to open and close the corresponding first intake opening 28 of the valve base plate 9 and a semi-circular second valve element part 38 which is shaped and sized to open and close the corresponding second intake opening 29. As will become apparent as the description proceeds, the second valve element part 38 serves as an element that receives a torsion stress. As is well shown in FIG. 5, the distance between the first valve element part 36 and the inner base portion of the intake valve plate 34 is larger than that between the second valve element part 38 and the inner base portion of the intake valve plate 34.

FIG. 5 shows in detail the arrangement of each reed valve element 35 relative to the corresponding cylindrical piston bore 3, corresponding first and second intake openings 28 and 29 and corresponding discharge opening 30. In this drawing, denoted by numeral 28c is a center of the first intake opening 28, and denoted by numeral 29c is a center of the second intake opening 29. Denoted by numeral 37L is a center line of the elastic arm portion 37 of the reed valve element 35.

As shown, upon assembly, the center line 37L of the arm portion 37 is consistent with a diametrical center line 3L of the cylindrical piston bore 3. The center 28c of the first intake opening 28 is on the center line 37L, while, the center 29c of the second intake opening 29 is away from the center line 37L. That is, the second intake opening 29 takes an offset position relative to the center line 37L of the reed valve element 35. Because of registration between the center line 37L and the diametrical center line 3L of the cylindrical piston bore 3, the distance D1 from the base portion of the reed valve element 35 to the center 28c of the first intake opening 28 can have the largest value in values available to the cylindrical piston bore 3.

As is seen from FIG. 2, each of the cylindrical piston bores 3 of the cylinder block 3 is formed at a right end peripheral surface (as viewed in FIG. 1) thereof with a semi-circular stopper recess 39 which is positioned and sized to receive a leading end 35a of the corresponding reed valve element 35.

Figure 12:
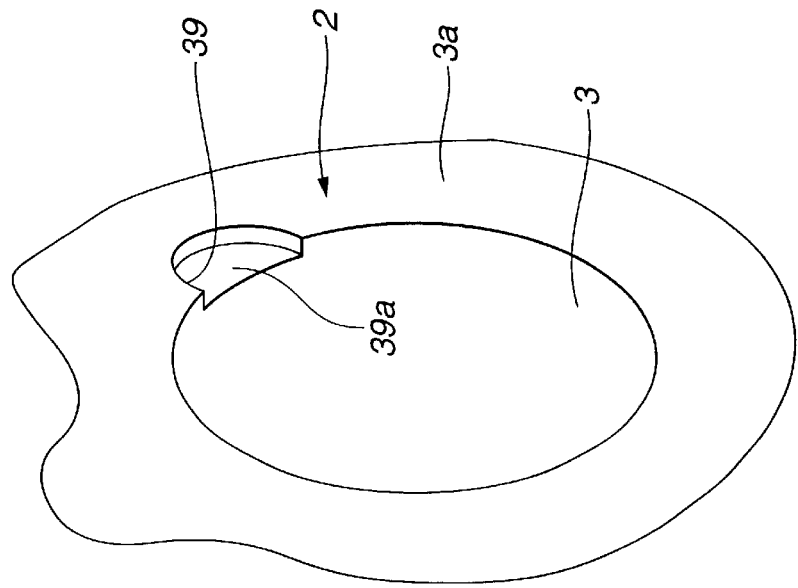
FIG. 12 is a perspective view of a front end face of the cylinder block where a stopper portion is provided.

As is seen from FIG. 12, the stopper recess 39 has a flat bottom 39a that is in parallel with the right end peripheral surface 3a of the piston bore 3, that is, in parallel with a major surface of the intake valve plate 34. The flat bottom 39a of each stopper recess 39 serves as a stopper for regulating a lifting of the corresponding reed valve element 35. That is, due to provision of the recesses 39, excessive lifting or opening movement of the valve elements is suppressed and thus generation of undesired noise is prevented or at least minimized.

In the following, operation of the compressor 100 of the first embodiment will be described.

For ease of understanding, the explanation will be commenced with respect to an intake stroke of one of pistons 27 of the compressor 100 with reference to FIG. 1.

That is, after a compression/discharge stroke, the piston 27 is about to start the intake stroke. Under this condition, the piston 27 has just moved from a top dead center (viz., the position shown in FIG. 1) toward a bottom dead center and thus the corresponding reed valve element 35 still closes the corresponding first and second intake openings 28 and 29.

When the piston 27 is moved leftward, that is, toward the bottom dead center, the internal pressure of the cylindrical piston bore 3 is reduced gradually, and when the internal pressure of the bore 3 becomes lower than that in the intake chamber 7, the reed valve element 35 opens the first and second intake openings 28 and 29 thereby to suck the refrigerant into the piston bore 3 from the intake chamber 7.

Figures 6A, 6B:
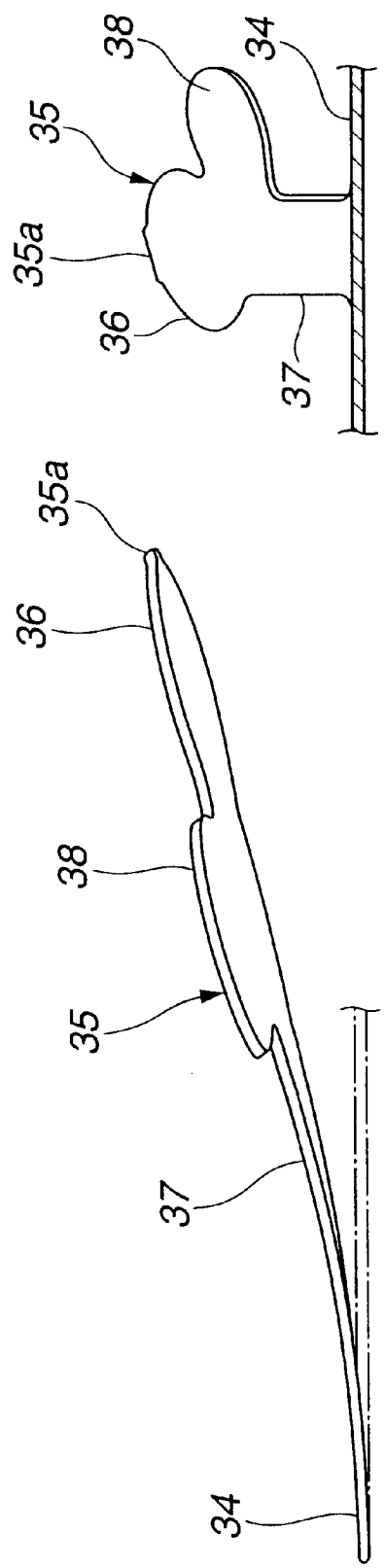

Upon this sucking flow of the refrigerant into the piston bore 3, the reed valve element 35 is slightly twisted Upon this, as is seen from FIGS. 6A and 6B, the reed valve element 35 is twisted by a certain angle due to a force that is received by the second valve element part 38 from a flow of refrigerant led from the second intake opening 29. That is, at the initial stage of the intake stroke of the piston 27, opening movement of the reed valve element 35 is carried out along with the twisting motion of the same. This brings about an improved opening operation of the valve element 35, so that pressure loss caused by the operation of the valve element 35 is reduced or minimized increasing the refrigerant intake efficiency at the initial stage of the intake stroke of the piston 27.

Furthermore, due to the twisted posture taken by the valve element 35, the refrigerant flow from the first and second intake openings 28 and 29 is forced to flow toward the cylindrical inner surface of the piston bore 3 inducing a vortex flow of the refrigerant in the piston bore 3. This promotes or increases the refrigerant intake efficiency at the initial stage of the intake stroke of the piston 27.

Due to further movement of the piston 27 toward the bottom dead center, the reed valve element 35 increases its opening degree. When, during this movement of the piston 27, the leading end 35a of the valve element 35 is brought into contact with the bottom of the stopper recess 39 formed on the cylinder block 2, the opening degree of the valve element 35 becomes fixed. Thus, thereafter, the refrigerant is sucked into the piston bore 3 at a rate determined by the fixed opening degree of the valve element 35. Even under this condition, the twisted posture of the valve element 35 is kept by the force possessed by the refrigerant flow from the second intake opening 29. Thus, the satisfied refrigerant intake efficiency is kept during the intake stroke of the piston 27.

When the piston 27 comes to the bottom dead center, the intake stroke is finished and the compression/discharge stroke of the piston 27 starts.

Figure 8:
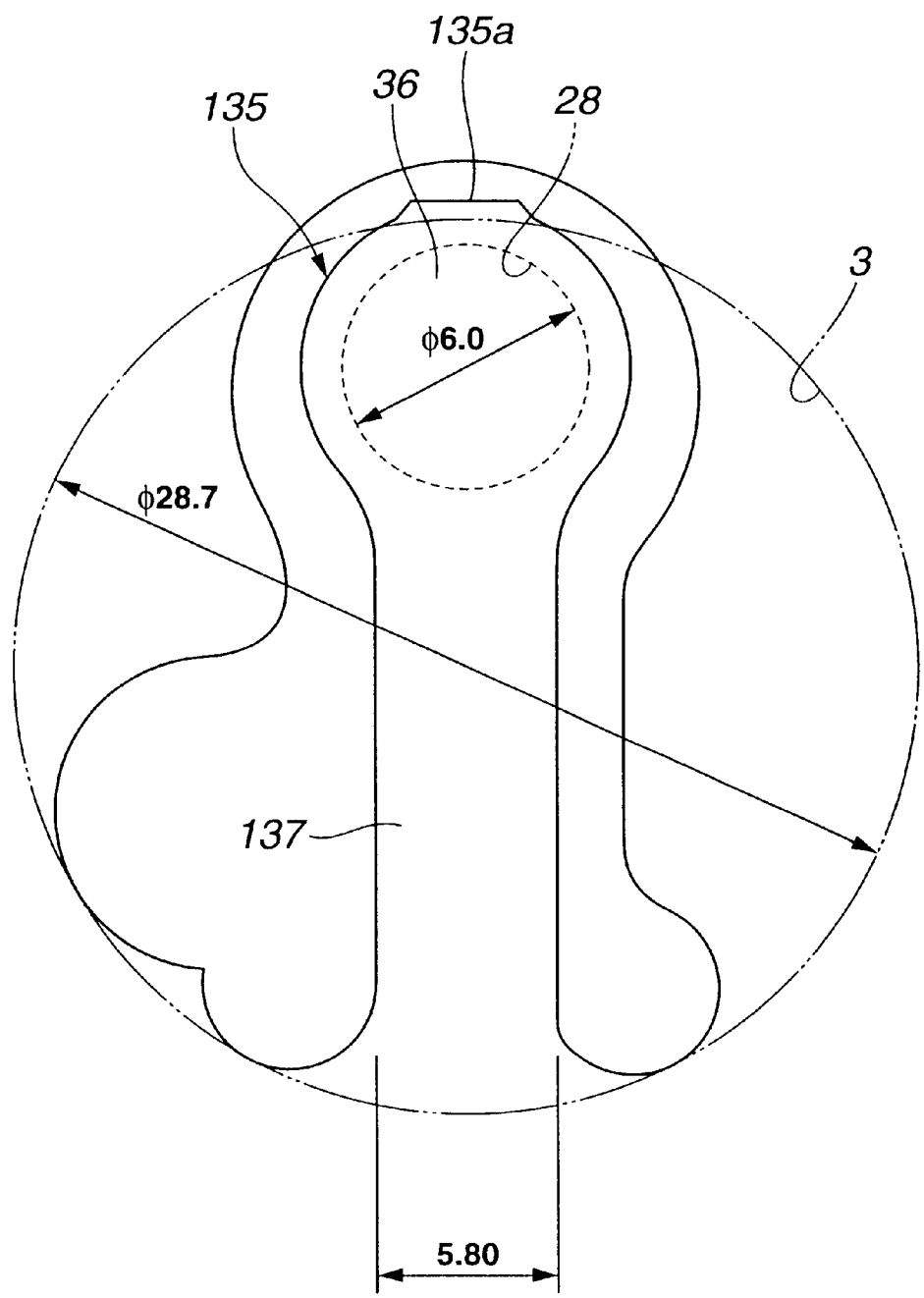
FIG. 8 is a view similar to FIG. 5, but showing a reed valve element employed in the conventional compressor.

In order to examine the performance, the wobble plate piston type compressor 100 of the first embodiment was subjected to a performance test investigating a relationship between the rotation speed (rpm) of the compressor 100 (viz., the drive shaft 10) and amount (Kg) of refrigerant led into the six piston bores 3 per hour (h). For comparison, a less preferred embodiment of the invention was also examined. As is seen from FIG. 8, a reed valve element 135 of the less preferred embodiment had no structure corresponding to the second valve element part 38 employed in the first embodiment 100. Thus, in the less preferred embodiment, there was no opening corresponding to the second intake opening 29 employed in the first embodiment 100.

In both compressors, the diameter of the cylindrical piston bore 3 was 28.7 mm, the diameter of the first intake opening 28 was 8.0 mm, the thickness of the valve element 35 or 135 was 0.3 mm, and the width D2 of the elastic arm portion 37 or 137 was 5.8 mm. In the compressor 100, the diameter of the second intake opening 29 was 5.0 mm, and the distance D3 (viz., offset degree of the second valve element part 38 relative to the center line 37L) between the center 29c of the second intake opening 29 and the diametrical center line 3L of the cylindrical piston bore 3 was 6.0 mm.

Figure 7:
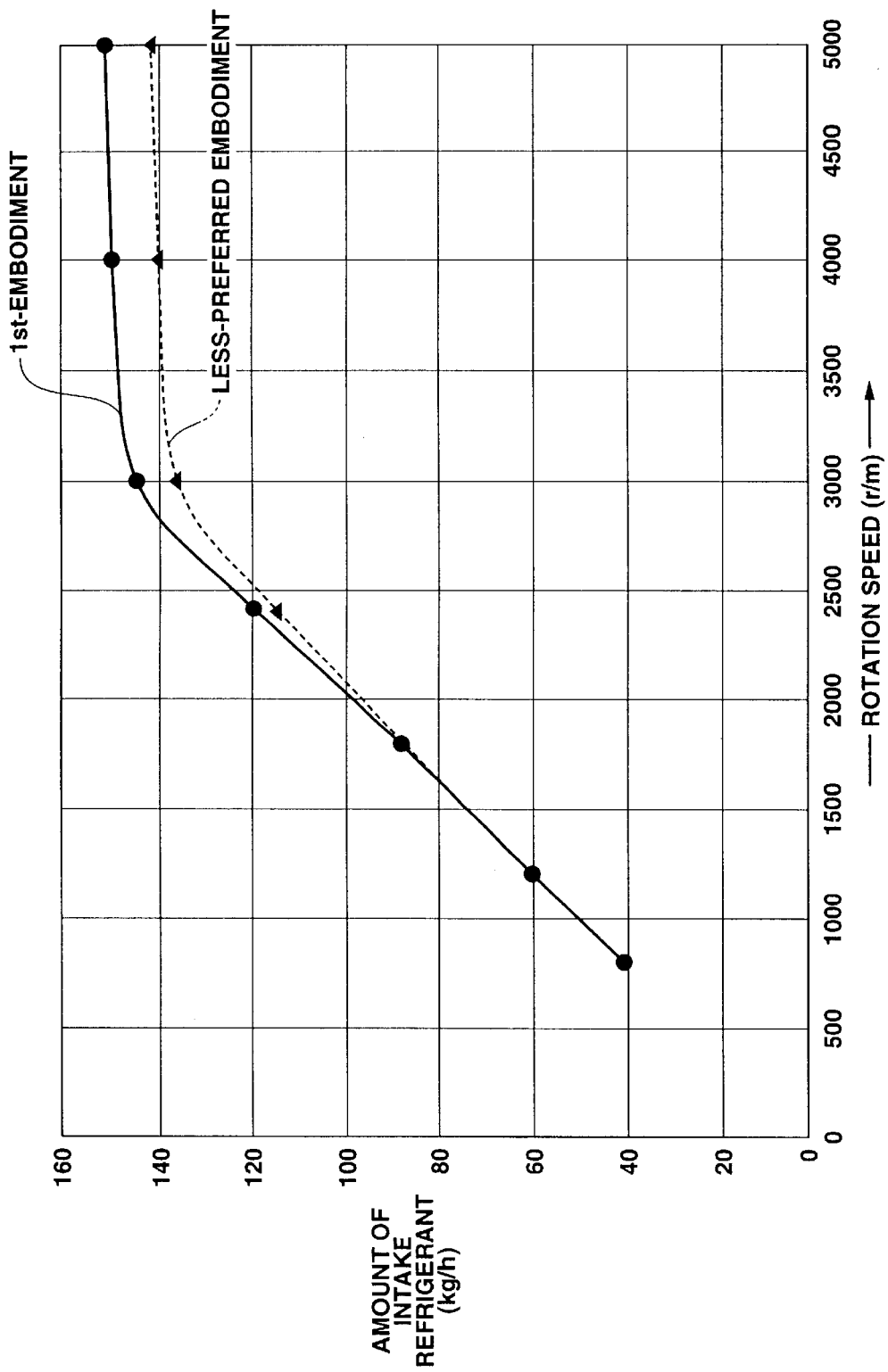
FIG. 7 is a graph showing a difference of refrigerant intake efficiency between the compressor of the first embodiment and a less preferred embodiment in terms of a relationship between rotation speed of the compressor and amount of refrigerant sucked into all cylindrical piston bores of the compressor.

The results of the performance test are depicted by the graph of FIG. 7.

As is seen from this graph, the compressor 100 of the invention showed a slightly higher refrigerant intake efficiency than the compressor of the less preferred embodiment when the rotation speed exceeded about 1,800 rpm, and the difference of efficiency between the two compressors gradually increased as the rotation speed increased to about 3,000 rpm, and the difference of efficiency was saturated when the rotation speed exceeded about 3,000 rpm.

As shown, when the rotation speed was less than 1,800 rpm, there was no substantial difference of efficiency between the two compressors. The reason may be because in such a low speed operation, the refrigerant flow speed was too low and thus the pressure loss caused by the operation of the valve element 35 or 135 was not marked. As is known to those skilled in the art, such pressure loss is proportional to the square of the flow speed. As has been described hereinabove, in the wobble plate piston type compressor 100 of the first embodiment, the valve base plate 9 is formed with two, viz., first and second intake openings 28 and 29 for each cylindrical piston bore 3, and the corresponding reed valve element 35 is so arranged that the center 29c of the second intake opening 29 is placed at an offset position with respect to the center line 37L of the reed valve element 35, and the reed valve element 35 is formed with the second valve element part 38 that faces the second intake opening 29. Thus, a pressure receiving area of the reed valve element 35 is enlarged improving the responsiveness of the valve element 35, and the twisting motion of the reed valve element 35 is assuredly carried out at the intake stroke of the piston 27. Thus, the refrigerant intake efficiency of each cylindrical piston bore 3 is increased thereby improving the performance of the compressor 100.

In the first embodiment 100, the offset degree of the second intake port 29 relative to the center line 37L of the reed valve element 35 is large. Thus, in operation, the valve element 35 can receive a marked torsional stress from the refrigerant flow led from the second take port 29, and thus, the twisting motion is assuredly exhibited by the valve element 35 during its opening operation.

In the first embodiment 100, the center line 37L of the reed valve element 35 is consistent with the diametrical center line 3L of the corresponding cylindrical piston bore 3. Accordingly, the elastic arm portion 37 of the element 35 can have the longest length, as has been described hereinabove. The longest length brings about an appropriate elasticity in opening and closing the first intake opening 28.

Furthermore, in the first embodiment 100, the following advantage is obtainable by the isolated arrangement of the first and second intake openings 28 and 29 in the valve base plate 9.

That is, in the first embodiment 100, enlargement of a refrigerant flow opening area is achieved by the two intake openings 28 and 29, not by increasing the size of one intake opening. Accordingly, the reed valve element 35 is protected from such an undesirable phenomenon that under operation, only a limited portion, viz., the first valve element part 36, would be applied with an excessive load by a refrigerant flow led from the enlarged intake opening 28. In other words, in the first embodiment 100, the first and second valve element parts 36 and 38 of the valve element 35 are protected from such excessive load.

In the first embodiment 100, the size of the first intake opening 28 is larger than that of the second intake opening 29. However, if desired, the size of the first intake opening 28 may be smaller than or equal to that of the second intake opening 29. In the first embodiment 100, the first and second intake openings 28 and 29 are circular in shape. However, if desired, the first and second intake openings 28 and 29 may have other shapes, for example, semi-circular, elliptic, rectangular and hexagonal shapes.

Figure 9:
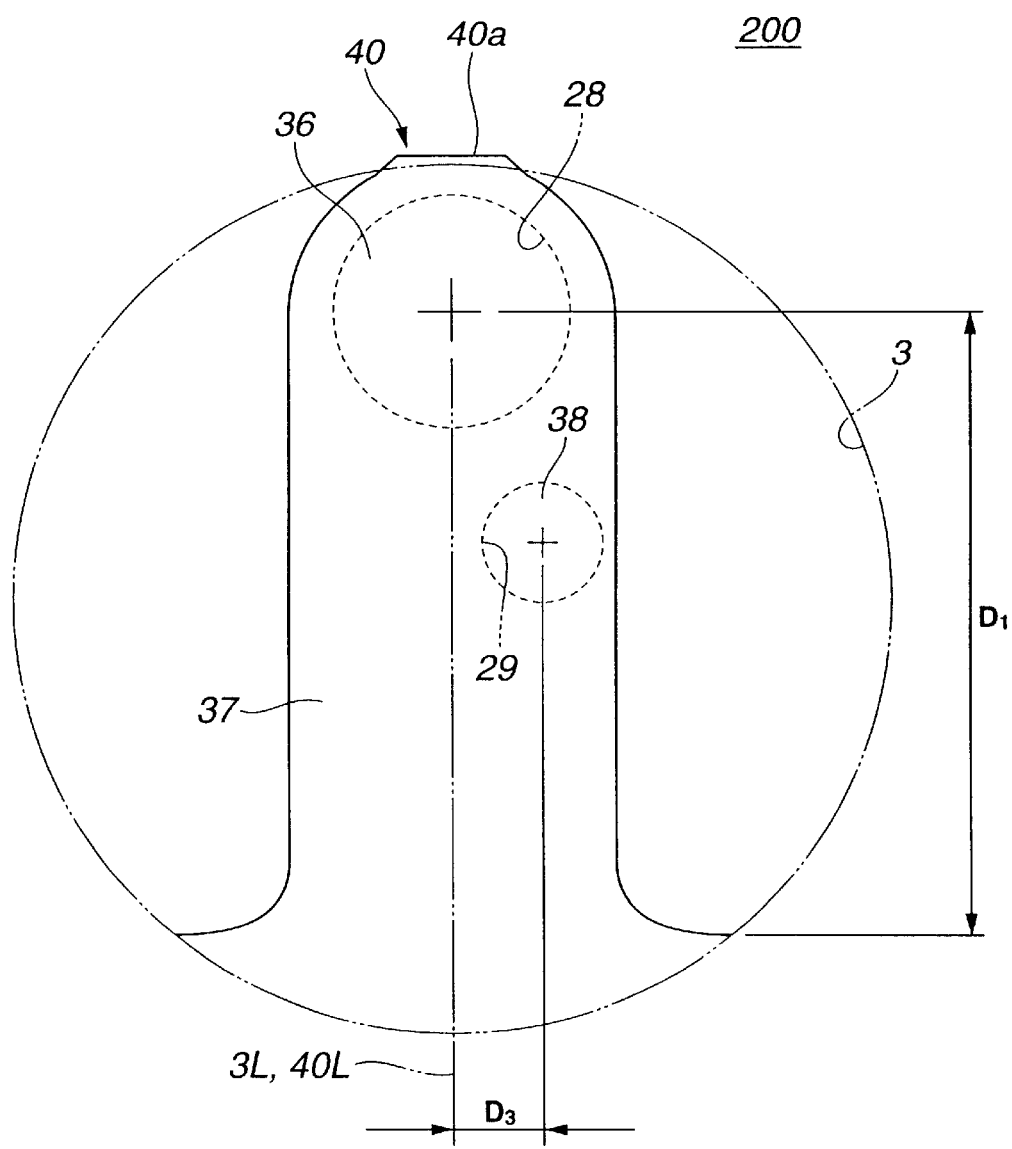
FIGS. 9, 10 and 11 are views similar to FIG. 5, but showing reed valve elements respectively employed in wobble plate piston type compressors of second, third and fourth embodiments of the present invention.

Referring to FIG. 9, there is shown a reed valve element 40 that is employed in a wobble plate piston type compressor 200 of a second embodiment of the present invention.

As shown, in this second embodiment 200, the reed valve element 40 has a symmetrical shape. That is, the reed valve element 40 comprises an elastic arm portion 37 whose center line 40L is consistent with a diametrical center line 3L of the cylindrical piston bore 3. As shown, the elastic arm portion 37 is so sized as to cover both the first and second intake openings 28 and 29. In other words, the first and second valve element parts 36 and 38 for opening and closing the first and second intake openings 28 and 29 are both included in the elastic arm portion 37. Denoted by numeral 40a is a leading end of the elastic arm portion 37, that is engageable with the stopper recess 39.

As is seen from the drawing, the second valve element part 38 is placed at an offset position relative to the center line 40L. The offset degree D3 of the second valve element part 38 is small relative to that of the above-mentioned first embodiment 100. This second embodiment 200 is particularly usable in the compressors of a type in which the diameter of each cylindrical piston bore 3 is relatively large and thus the elastic arm portion 37 has an increased length. That is, due to the increased length, the elastic arm portion 37 can be readily twisted by a small force (or moment) caused by the smaller offset degree D3 of the second valve element part 38.

Figure 10:
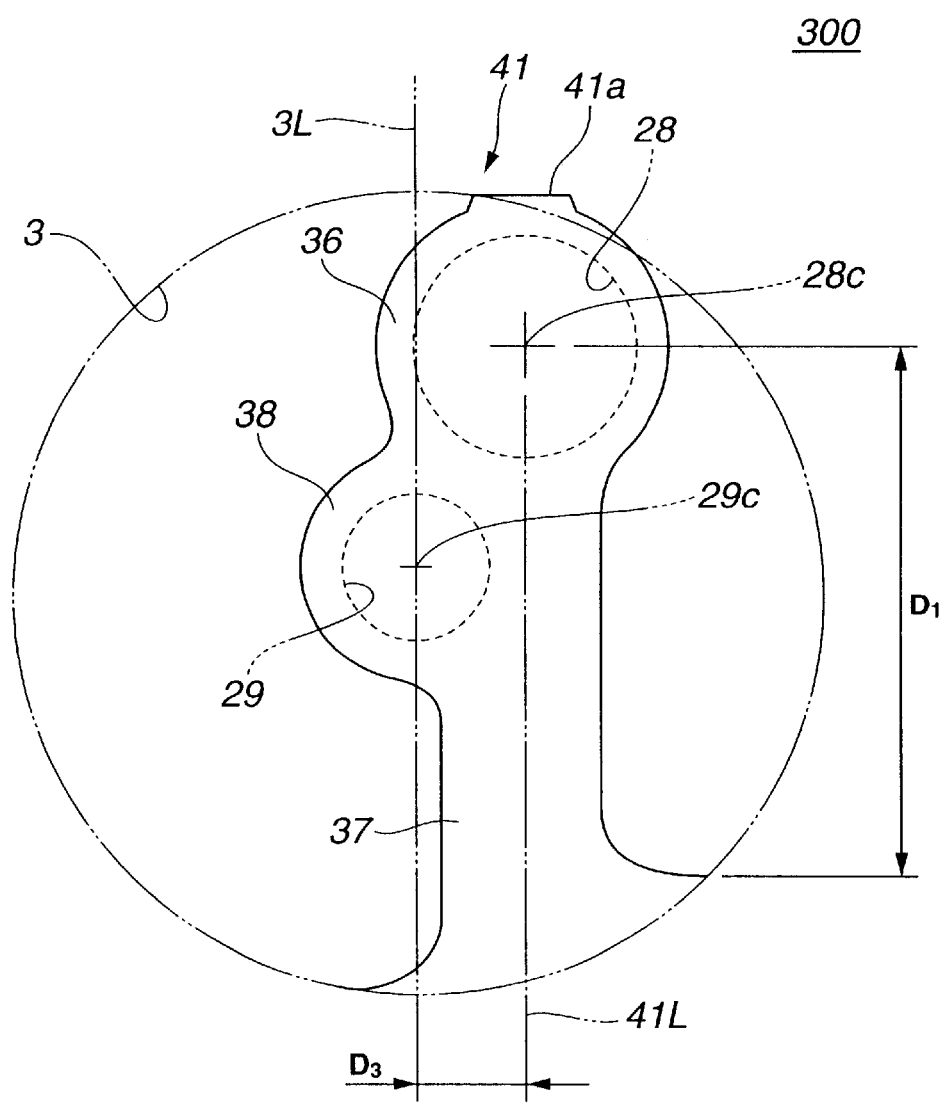

Referring to FIG. 10, there is shown a reed valve element 41 that is employed in a wobble plate piston type compressor 300 of a third embodiment of the present invention.

As shown, in this third embodiment 300, the center line 41L of the elastic arm portion 37 of the reed valve element 41 is placed at an offset position relative to the diametrical center line 3L of the cylindrical piston bore 3. The center 28c of the first intake opening 28 is consistent with the center line 41L, and the center 29c of the second intake opening 29 is consistent with the diametrical center line 3L. Denoted by numeral 41a is the leading end of the elastic arm portion 37, that is engageable with the stopper recess 39. In this third embodiment 300, the twisting of the reed valve element 41 is much assuredly made when the leading end 41a of the arm portion 37 is received by the stopper recess 39.

Figure 11:
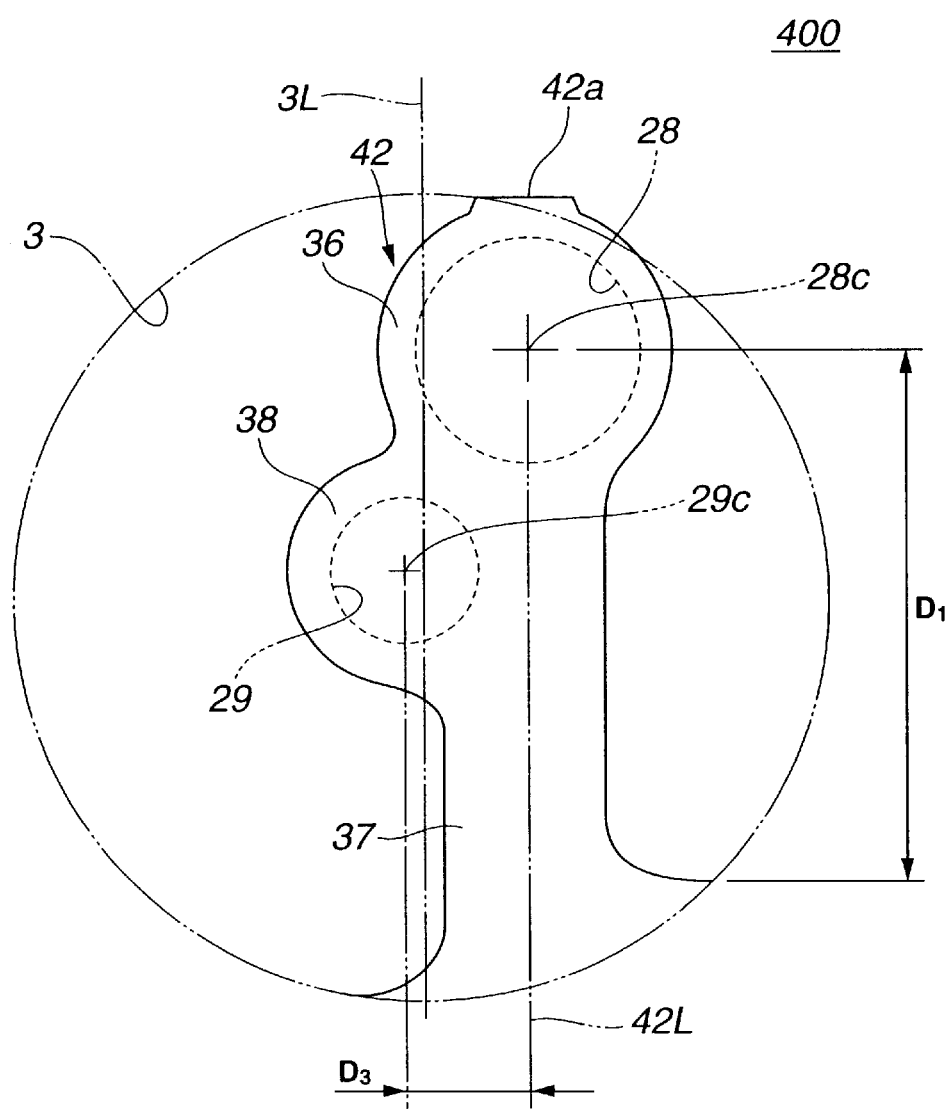

Referring to FIG. 11, there is shown a reed valve element 42 that is employed in a wobble plate piston type compressor 400 of a fourth embodiment of the present invention.

As shown, this embodiment 400 is substantially the same as the above-mentioned third embodiment 300 except that in the fourth embodiment 400 the center 29c of the second intake opening 29 is not consistent with the diametrical center line 3L of the cylindrical piston bore 3. Denoted by numeral 42a is the leading end of the elastic arm portion 37, that is engageable with the stopper recess 39.

Figure 13:
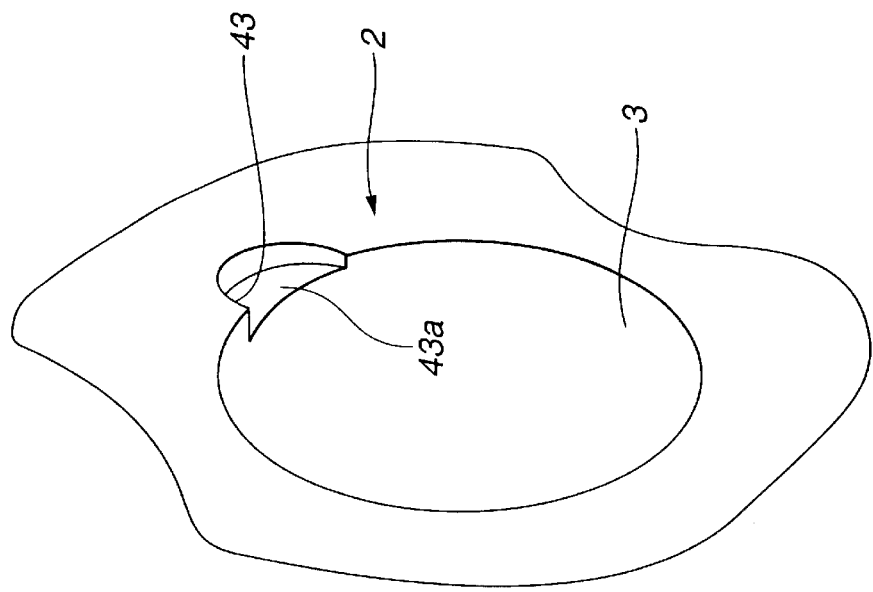
FIG. 13 is a view similar to FIG. 12, but showing a modification of the stopper portion.

If desired, as is seen from FIG. 13, each stopper recess 43 may have an inclined bottom 43a that is inclined relative to the right end peripheral surface 3a of the piston bore 3, that is, relative to the major surface of the intake valve plate 34. As shown, the inclination of the bottom 43a is so made as to promote the twisting motion of the reed valve element 35 40, 41 or 42 when the leading end 35a, 40a, 41a or 42a of the valve element 35, 40, 41 or 42 is fully received by the stopper recess 43. Although the above-description is directed to the wobble plate piston type compressor, the invention can be applied to a so-called swash plate piston type compressor. In this case, one end of each piston is slidably engaged with a periphery of the swash plate through shoes. The entire contents of Japanese Patent Application 2001-134482 filed May 1, 2001 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A piston type compressor for compressing a fluid, comprising:

a cylinder black having at least one piston bore formed therein;

a piston slidably received in said piston bore;

a drive unit for sucking the fluid into said piston bore and compressing the fluid in the piston bore by using said piston;

a housing having an intake chamber for taking the fluid thereinto, said housing being attached to one end of said cylinder block so that one end of said piston bore faces said intake chamber;

a valve base plate disposed between said end of said cylinder block and said housing, said valve base plate having mutual isolated first and second intake openings through which said intake chamber and said piston bore are fluidly communicated; and an intake valve plate disposed between said end of said cylinder block and said valve base plate and having a reed valve element defined thereby, said reed valve element being arranged to open said first and second intake openings thereby to introduce the fluid into said piston bore from said intake chamber therethrough when said piston is moved away from said reed valve element and close said first and second intake openings thereby to stop the fluid introduction into the piston bore from said intake chamber when said piston is moved toward said reed valve element, in which said drive unit is arranged to induce a reciprocating movement of said piston in said piston chamber, in which said reed valve element comprises:

an elastic arm portion which extends from an inner base portion of said intake valve plate along an imaginary center line;

a first valve element part integral with said elastic arm portion and shaped and sized to open and close said first intake opening, said first valve element part being placed on said imaginary center line; and a second valve element part integral with said elastic arm portion and shaped and sized to open and close said second intake opening, wherein said second valve element part is offset relative to said imaginary center line.

2. A piston type compressor as claimed in claim 1, in which said imaginary center line of said elastic arm portion is consistent with a diametrical center line of said piston bore.

3. A piston type compressor as claimed in claim 2, in which said imaginary center line of said elastic arm portion substantially passes through a center of said first intake opening.

4. A piston type compressor as claimed in claim 3, in which a diametrical center line of said piston bore substantially passes through a center of said second intake opening.

5. A piston type compressor as claimed in claim 1, in which a distance between said first valve element part and said inner base portion is greater than that between said second valve element part and said inner base portion.

6. A piston type compressor as claimed in claim 1, in which each of said first and second valve elements parts has a rounded periphery.

7. A piston type compressor as claimed in claim 1, in which said elastic arm portion, said first valve element and said second valve element are merged to constitute a generally rectangular reed valve element.

8. A piston type compressor as claimed in claim 1, further comprising a stopper structure by which a leading end of said elastic arm portion of said reed valve element is restrained when said elastic arm portion is lifted by a given degree.

9. A piston type compressor as claimed in claim 8, in which said stopper structure comprises a recess formed at a peripheral end portion of said piston bore, said recess having a flat bottom.

10. A piston type compressor as claimed in claim 9, in which said flat bottom of said recess is in parallel with a major surface of said intake valve plate.

11. A piston type compressor as claimed in claim 9, in which said flat bottom of said recess is inclined relative to a major surface of said intake valve plate.

12. A piston type compressor as claimed in claim 11, in which the inclination of said flat bottom is so made as to promote a twisting motion of the reed valve element which would be produced when, upon lifting of said reed valve element from said first and second intake openings, the fluid is led into the piston chamber from said intake chamber through said first and second intake openings impinging against said first and second valve element parts.

13. A piston type compressor as claimed in claim 1, in which said drive unit comprises a wobble plate which effects a wobble motion under operation of said compressor, and a piston rod having one end universally pivotally connected to said wobble plate and the other end universally pivotally connected to said piston.

14. A piston type compressor as claimed in claims 1, in which said drive unit comprises a swash plate which effects a swash plate motion under operation of said compressor, said swash plate being operatively connected to said piston to induce the reciprocating movement of the piston when operated.

15. A reciprocating piston type compressor for compressing a fluid, comprising:

a cylinder block having at least one cylindrical piston bore formed therein;

a piston slidably received in said piston bore;

a drive unit for inducing reciprocating movement of said piston in said piston bore;

a housing having an intake chamber for taking the fluid thereinto, said housing being attached to one end of said cylinder block so that one end of said piston bore faces said intake chamber;

a valve base plate disposed between said end of said cylinder block and said housing, said valve base plate having mutually isolated first and second intake openings through which said intake chamber and said piston bore are fluidly communicated; and an intake valve plate disposed between said end of said cylinder block and said valve base plate and having at least one reed valve element defined thereby, said reed valve being arranged to open said first and second intake openings thereby to introduce the fluid into said piston bore from said intake chamber therethrough when said piston is moved away from said reed valve element and close said first and second intake openings thereby to stop the fluid introduction into said piston bore from said intake chamber when said piston is moved toward said reed valve element, said reed valve element including an elastic arm portion which extends from an inner base portion of said intake valve plate along an imaginary center line, a first valve element part integral with said elastic arm portion and shaped and sized to open and close said first intake opening and a second valve element part integral with said elastic arm portion and shaped and sized to open and close said second intake opening, said first valve element part being placed on said imaginary center line said second valve element part being placed offset relative to said imaginary center line.

* * * * *